United States Patent
Valentin-Rumpel

(10) Patent No.: US 7,540,302 B2
(45) Date of Patent: Jun. 2, 2009

(54) FIELD UNIT FOR MOUNTING ON AN ACTUATOR

(75) Inventor: Frank Valentin-Rumpel, Gross-Umstadt (DE)

(73) Assignee: Samson AG, Frankfurt am Main ( * ) Notice: Subject to any disclaimer, the term of this patent is extended or adjusted under 35 U.S.C. 154(b) by 616 days.

(21) Appl. No.: 11/271,370

(22) Filed: Nov. 10, 2005

(65) Prior Publication Data

US 2006/0162783 A1 Jul. 27, 2006

(30) Foreign Application Priority Data

Jan. 27, 2005 (DE) .................. 10 2005 003 771

(51) Int. Cl.
*F16K 37/00* (2006.01)
(52) U.S. Cl. .................. 137/556; 137/554; 116/277
(58) Field of Classification Search .................. 137/556, 137/556.3, 553; 116/277
See application file for complete search history.

(56) References Cited

U.S. PATENT DOCUMENTS

| | | | | |
|---|---|---|---|---|
| 2,456,403 A | * | 12/1948 | Goehring | 137/556.3 |
| 3,390,943 A | * | 7/1968 | Myers | 137/556.3 |
| 5,538,037 A | * | 7/1996 | Piz ao | 137/556 |

FOREIGN PATENT DOCUMENTS

DE  200 07 204 U 1  9/2000

* cited by examiner

*Primary Examiner*—Kevin L Lee
(74) *Attorney, Agent, or Firm*—Woodling, Krost and Rust

(57) ABSTRACT

The invention pertains to a field unit (10) for mounting on an actuator (12) with a pickup device (14) in the field unit (10) to register the position of the actuator (12) and with an indicator (16) located correspondingly on a movable element (15) of the actuator (12) to indicate the position of the actuator (12), where, when the field unit (10) is mounted on the actuator (14), the pickup device (14) of the field unit (10) can be linked with the indicator (16) of the actuator (12). The invention is characterized in that the pickup device (14) of the field unit (10) is in working connection with a locking element (18), and in that the pickup device (14) can be held by this locking element (18) in a first position—the mounting position—and can be released from the mounting position by the actuation of the locking element (18).

20 Claims, 1 Drawing Sheet

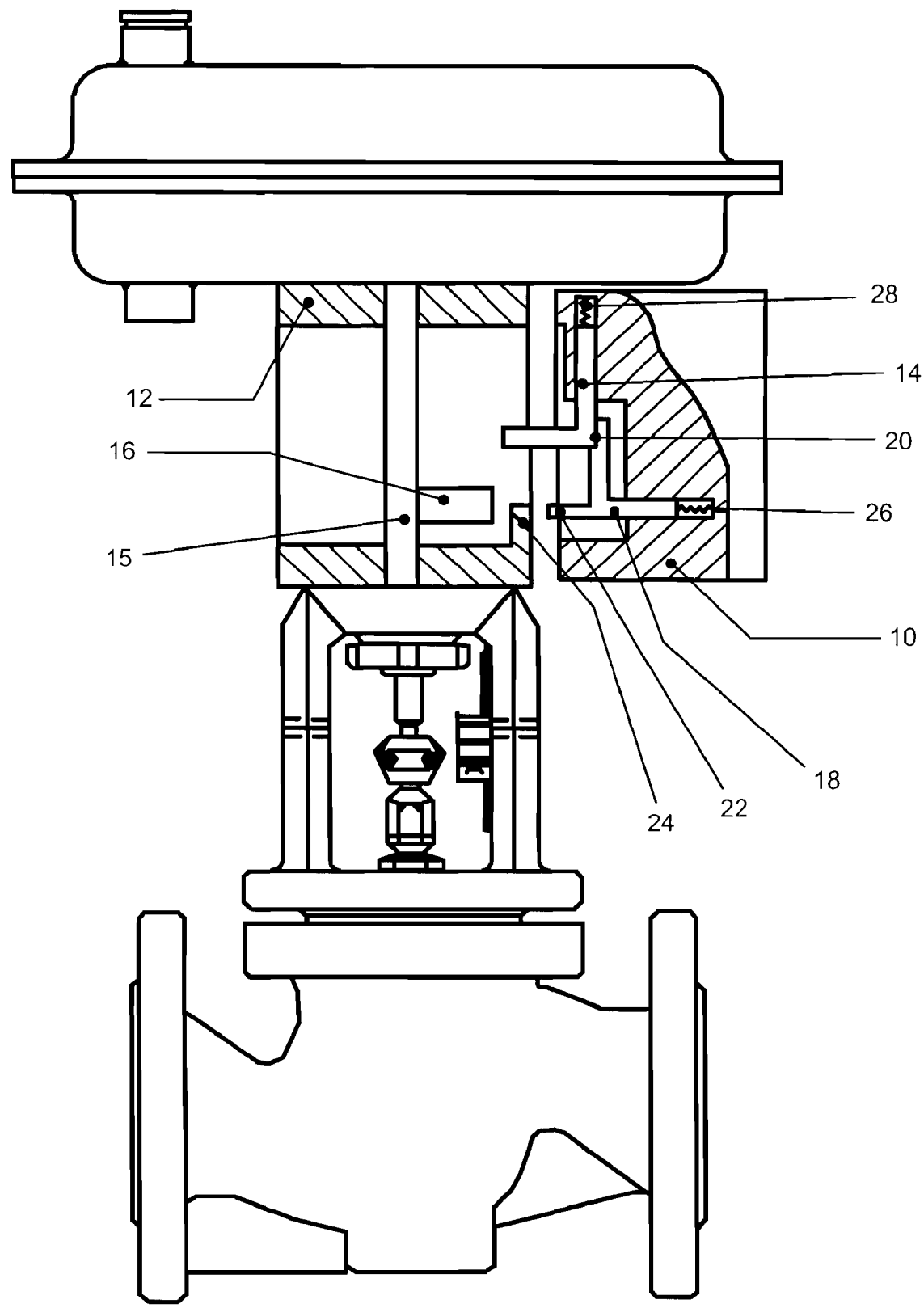

FIELD UNIT FOR MOUNTING ON AN ACTUATOR

This patent application claims priority to German Patent application number 10 2005 003 771.2-55 filed Jan. 27, 2005.

FIELD OF THE INVENTION

The invention pertains to a field unit for mounting on an actuator.

BACKGROUND OF THE INVENTION

It is known that a field unit such as a positioner, a response synchro, or a limit switch is frequently attached to or installed on an electrical or pneumatic servo/actuator for positioning a valve in accordance with DIN IEC 60534-6.

The mounting of the field unit must encompass essentially two tasks: First, a connection must be established between the field unit and the actuator; second, the linkage—usually mechanical—by which the position of the actuator is conveyed to the field unit must be connected and adjusted.

This procedure does not usually cause any problems when performed at the factory of the manufacturer. When a unit is installed in the field, however, considerable difficulties can arise.

Depending on the weather conditions and on the accessibility of the drive unit, the following aspects of the mounting process can be disadvantageous: The simultaneous mounting of the field unit and the connection of the displacement indicator linkage—usually done by introducing a pin into a slot—requires two hands and depends on the exact positioning of the field unit. This can lead to an incorrect connection of the displacement indicator linkage, which in turn causes the actuator to operate incorrectly.

The housing of the field unit, furthermore, must be opened to allow the manual positioning of the displacement indicator linkage. This leads to the disadvantage that dirt and moisture can intrude into the interior of the field unit.

In addition, the manual positioning of the field unit also means that expensive measures must be taken to design the interior of the unit so that it can be adjusted properly. Providing a mechanical access hole, for example, and a corresponding opening in the circuit board for the electronic components is associated with high manufacturing costs.

The manual operations which must be performed when mounting the field unit on the actuator, namely, the positioning and adjustment of the components, also present the risk of injury.

To minimize the problems mentioned above associated with the mounting of a field unit on an actuator, various elaborations of the interface between the field unit and the actuator are known. For example, in the case of the TZID-C positioner developed by ABB, the engagement of a pin in a slot is replaced by the engagement of a spring-loaded cone in a slot. Although this does make mounting easier, most of the disadvantages mentioned above, such as the need to open the field unit, the two-handed procedures, etc., remain unaffected.

Another improvement in the ease of mounting is provided by the Samson 3730 family of positioners. Here the pin-in-slot connection is replaced by a spring-loaded pin, which rolls along a plane. It is therefore no longer necessary to position the pin accurately in the slot within a narrow range of tolerances. Instead, the linking lever can be pushed well away from the contact position during the mounting procedure. Although this again makes it easier to install the unit, the disadvantages of two-handed manipulation and of the need to open the field unit, with all the associated design disadvantages, remain unaffected.

SUMMARY OF THE INVENTION

The invention is based on the task of improving a field unit for mounting on an actuator in such a way that the field unit can be mounted easily on the actuator without the need to deal with any of the previously mentioned disadvantages.

The invention is based on the realization that faster and easier installation can be guaranteed by reducing the number of procedures required to mount the field unit on the actuator.

For this purpose, the field unit which is to be mounted on the actuator has a pickup device for registering the position of the actuator. Accordingly, an indicator for conveying the position of the actuator is mounted on a movable element of the actuator, and when the field unit is being mounted on the actuator, the pickup device can be linked with this indicator. According to the invention, the pickup of the field unit is in working connection with a locking element and is held in place by this locking element in a first position—the mounting position. By actuation of the locking element during or after the mounting of the field unit, the pickup is released from the mounting position so that it can be linked with the indicator of the actuator. The manner in which the pickup of the field unit is held in the mounting position according to the invention guarantees that the unit can mounted quickly and easily, because attaching the field unit to the actuator requires merely that the field unit be brought up to the actuator and that the locking element be actuated. Another advantage is that the entire mounting process can be carried out one-handedly. No other manipulations in the intermediate space between the field unit and the actuator are necessary. In addition, thanks to the inventive design, there is no longer any need to make any fine adjustments or to open the field unit.

To ensure that the pickup device of the field unit and the indicator of the actuator will link up with each other automatically after the locking element has been actuated, the pickup device of the field unit is in working connection with certain means. After the pickup device has been released from the mounting position, these means have the effect of automatically moving the pickup device toward the indicator of the actuator.

For the sake of simplicity, these means also generate the necessary contact force for establishing the link between the pickup device of the field unit and the indicator of the actuator. This offers the advantage that no other components are required to produce the force responsible for establishing the link between the pickup device of the field unit and the indicator of the actuator.

These means are advisably designed in such a way that, when the pickup device of the field unit is released from the mounting position and there is no linkage with the indicator of the actuator, the means move the pickup device of the field unit into a second position—the end position. For the sake of simplicity, the end position of the pickup device of the field unit is determined by a lower stop. This function can also be realized, for example, by the locking element. The presence of a second, defined position of the pickup device of the field unit offers the advantage that a "binary coding" is provided for the position of the pickup device of the field unit. As a result, the user is able to tell the difference easily and correctly between the "ready-to-mount" status and the "not-ready-to-mount" status of the field unit.

So that the locking element can be moved back to its original position after it has been actuated, the locking element is in working connection with a reset mechanism.

The reset mechanism and the means which cause the automatic movement of the pickup device of the field unit are preferably designed as mechanical and/or fluid and/or electromagnetic components.

The locking element advisably has an area designed as a lever, which makes it possible to actuate the locking element mechanically. It is conceivable, for example, that, to facilitate the actuation of the locking element, the area of the locking element designed as a lever projects out from the housing of the field unit and can thus be easily actuated mechanically.

According to another embodiment of the invention, the locking element can be actuated by fluid and/or pneumatic and/or electrical means.

The area of the locking element which is designed as a lever can preferably be actuated by a contact area of appropriate design provided on the housing of the actuator. As a result of this easy-to-realize lever/contact area interface, the locking element can be smoothly actuated mechanically during the mounting process.

To ensure reliable contact between the pickup device of the field unit and the locking element, the locking element has a holding device, by means of which the locking element is brought into working connection with the pickup device. To prevent the holding device from engaging unintentionally, the holding device is designed so that there is only one relative position between the locking element and the pickup device of the field unit in which the holding device can perform its holding function.

So that the previously mentioned mounting position can be uniquely identified, the locking element can hold the pickup device of the field unit in only one position, namely, the mounting position. It is also advisable for the mounting position to characterize one of the end points of the detection range of the field unit.

To avoid the need for further manipulations, the holding device of the locking element performs its holding function for the pickup device of the field unit automatically.

According to one embodiment of the invention, the holding device of the locking element holds the pickup device on the locking element by a positive connection. Holding by a positive connection is a reliable and easy-to-realize solution.

According to another embodiment of the invention, the holding device of the locking element holds the pickup device on the locking element by a non-positive connection and/or by a self-substance connection.

For the sake of simplicity, the locking element, the holding device, and the area designed as a lever and/or the means for actuating the locking element are designed as a one-piece component.

So that the field unit can be remounted after it has been removed, the pickup device of the field unit can be moved back from the end position to the mounting position.

To ensure that the field unit can be mounted on the actuator easily, the field unit can be mounted on the housing of the actuator by means of fastening elements such as screws, which are readily accessible from the outside.

The description given above is not limited to the mounting of a field unit on an actuator. On the contrary, it is also possible in this way to connect a displacement indicator linkage inside the field unit to indicate the displacement between a base housing and a cover. For this purpose, a device for indicating displacement between the base housing and the housing cover is provided inside the housing of the field unit. The device has a pickup, a locking element, and an indicator, where the pickup, the locking element, and the indicator are designed in accordance with what has already been described above.

Additional advantages, features, and possible applications of the present invention can be derived from the following description in conjunction with the exemplary embodiment illustrated in the drawing.

The invention is explained in greater detail below on the basis of the exemplary embodiment illustrated in the drawing.

BRIEF DESCRIPTION OF THE DRAWING

The terms and reference numbers in the attached list of reference numbers are used in the following description, in the claims, in the abstract, and in the drawing. In the drawing:

The drawing FIGURE shows a simplified side view of a field unit for mounting on an actuator.

DESCRIPTION OF THE INVENTION

The drawing FIGURE shows in more-or-less schematic fashion a field unit 10 for mounting on an actuator 12.

In addition to the electronic components, not shown here for the sake of clarity, the field unit 10 comprises a pickup device 14, which can register the position of the actuator 12.

So that it can convey its position effectively, the actuator 12 has an indicator 16, mounted on a movable valve rod 15.

The pickup device 14 of the field unit 10 is in working connection with a locking element 18 and is held in position by the locking element 18 in the position shown, referred to in the following as the "mounting position". The locking element 18 can hold the pickup device 14 of the field unit 10 only in this one position, namely, in the mounting position illustrated.

Also characteristic of the illustrated mounting position is that the pickup device 14 of the field unit 10 is situated at an end point of the detection range of the field unit 10.

So that the pickup device 14 can be held reliably in the mounting position, the locking element 18 has an automatic holding device 20. In the present case, the holding device 20 holds the pickup device 14 on the locking element 18 by means of a positive connection.

So that the pickup device 14 of the field unit 10 can be released easily from the holding device 20 of the locking element 18, an area 22, designed in the form of a lever 22, is provided on the locking element 18. This lever 22 projects out from the housing of the field unit and can be accessed and actuated easily from the outside. So that the lever 22 can be mechanically actuated easily when the field unit is being mounted on the actuator 12, the actuator 12 has an appropriately designed contact surface 24.

The locking element 18 is also in working connection with a first spring 26. The first spring 26 has the function of a reset mechanism. In addition to maintaining the locked position between the locking element 18 and the pickup device 14, this spring also guarantees that it will be possible to lock the pickup device 18 automatically in the mounting position again, after the pickup device 14 has been released from the locking element 18.

In a corresponding manner, the pickup device 14 of the field unit 10 is in working connection with a second spring 28 so that, after the pickup device 14 has been released from the mounting position, it is ensured that the indicator 16 of the actuator 12 and the pickup device 14 of the field unit will be linked automatically.

The second spring 28 is arranged in such a way that, after the pickup device 14 has been released from the mounting position, the resulting spring force moves the pickup device 14 toward the indicator 16 of the actuator.

The actual procedure for mounting the field unit 10 on the actuator 12 is as follows: Before the field unit 10 is mounted, the pickup device 14 must be locked in the mounting position by the locking element 18.

The next step is to bring the field unit 10 up to the actuator 12 in such a way that initially there is an overlap between the pickup device 14 of the field unit 10 and the indicator 16 of the positioner.

In the next mounting step, the lever 22 comes in contact with the area of the housing of the actuator 12 designed to serve as the contact surface 24. As a result of the contact of the lever 22 with the contact surface 24, the locking element 18 is automatically actuated mechanically and moved against the force of the first spring 26, as a result of which the pickup device 14 is released from the mounting position.

By means of the second spring 28, which is in working connection with the pickup device 14, the pickup device 14 moves automatically toward the indicator 16 of the actuator. As a result, a functional linkage is established between the field unit 10 and the actuator 12.

There is no need for any additional manipulations in the form of fine adjustments, for example, in the area between the field unit 10 and the actuator 12. Thus the mounting of the field unit 10 is limited simply to the previously described approach of the field unit 10 to the actuator 12 and to the following attachment of the two components to each other by means of screws, not shown here for the sake of clarity. The step of manually linking the pickup device 14 with the indicator 16, conventional in the past, is thus eliminated.

When the field unit 10 is removed, the second spring 28 also causes the pickup device 14 to move into a second defined position, referred to in the following as the "end position". Like the mounting position, the end position is also characterized in that the pickup device 14 of the field unit is at an end point of the detection range of the field unit 10. The locking element 18 holds the pickup device 14 of the field unit in this end position.

As a result of this effective "binary coding" of the position of the pickup device 14, the user is able to distinguish easily and correctly between the "ready-to-mount" status and the "not-ready-to-mount" status by determining whether the pickup device 14 is in the upper mounting position or in the lower end position.

LIST OF REFERENCE NUMBERS 10 field unit
12 actuator
14 pickup device
15 valve rod
16 indicator
18 locking element
20 holding device
22 lever
24 contact surface
26 first spring
28 second spring

The invention claimed is:

1. Field unit (10) for mounting on an actuator (12), comprising: a pickup device (14) to register the position of the actuator (12) and with an indicator (16) located correspondingly on a movable element (15) of the actuator (12) to indicate the position of the actuator (12), where, when the field unit (10) is mounted on the actuator (12), the pickup device (14) of the field unit (10) can be linked with the indicator (16) of the actuator (12), the pickup device (14) of the field unit (10) is in working connection with a locking element (18), and, in that the pickup device (14) is held by this locking element (18) in a first mounting position and is released from the first mounting position by the actuation of the locking element (18).

2. Field unit according to claim 1, wherein when the locking element (18) is actuated, the pickup device (14) of the field unit (10) can be moved automatically by spring means toward the indicator (16) of the actuator (12).

3. Field unit according to claim 2, wherein the spring means also generate the contact force necessary to establish the link between the pickup device (14) of the field unit (10) and the indicator (16) of the actuator (12).

4. Field unit according to claim 1, wherein when the pickup device (14) of the field unit (10) is released from the first mounting position and there is no link with the indicator (16) of the actuator (12), the spring means move the pickup device (14) of the field unit (10) into a second end position.

5. Field unit according to claim 1, wherein the locking element (18) is in working connection with a reset mechanism.

6. Field unit according to claim 1, wherein the spring means and the reset mechanism are mechanical and/or fluid and/or electromagnetic components (26, 28).

7. Field unit according to claim 1, wherein the locking element (18) includes a lever (22), by which the locking element (18) can be mechanically actuated.

8. Field unit according to claim 7, wherein the lever (22) is actuated by the housing of the actuator (12).

9. Field unit according to claim 1, wherein the locking element (18) can be actuated by fluid and/or pneumatic and/or electromagnetic means.

10. Field unit according to claim 1, wherein the locking element (18) is in working connection with the pickup device (14) by way of a holding device (20), where the holding device (20) can hold the pickup device (14) only in one position.

11. Field unit according to claim 10, wherein the pickup device (14) can be held by the holding device (20) only in the mounting position.

12. Field unit according to claim 10, wherein the holding device (20) holds the pickup device (14) automatically in the mounting position.

13. Field unit according to claim 1, wherein a holding device (20) is provided, said holding device holds the pickup device (14) on the locking element (18) by means of a positive connection.

14. Field unit according to claim 1, wherein a holding device is provided, the holding device (20) holds the pickup device (14) on the locking element (18) by means of a non-positive connection and/or by a self-substance connection.

15. Field unit according to claim 1, wherein a holding device is provided, the locking element (18), the holding device (20), and the lever (22) are one-piece.

16. Field unit according to claim 1, wherein the pickup device (14) of the field unit (10) can be moved from the end position back to the mounting position.

17. Field unit according to claim 1, wherein the field unit (10) can be attached by fastening elements to the housing of the actuator (12).

18. Field unit according to claim 2, wherein when the pickup device (14) of the field unit (10) is released from the mounting position and there is no link with the indicator (16) of the actuator (12), the spring means moves the pickup device (14) of the field unit (10) into a second end position.

19. Field unit according to claim 2, wherein the locking element (18) is in working connection with a reset mechanism.

20. Device inside the housing of a field unit for conveying information concerning the displacement between a base housing and a housing cover, said field unit (10) mounts on an actuator (12), comprising: a pickup device (14) to register the position of the actuator (12), an indicator (16) located correspondingly on a movable element (15) of the actuator (12) to indicate the position of the actuator (12), where, when the field unit (10) is mounted on the actuator (12), the pickup device (14) of the field unit (10) can be linked with the indicator (16) of the actuator (12), the pickup device (14) of the field unit (10) is in working connection with a locking element (18), and the pickup device (14) can be held by this locking element (18) in a first mounting position and can be released from the first mounting position by the actuation of the locking element (18).

\* \* \* \* \*